W. H. MUSSEY.
BASKET RACK.
APPLICATION FILED FEB. 21, 1912.
1,069,569.
Patented Aug. 5, 1913.
2 SHEETS—SHEET 1.
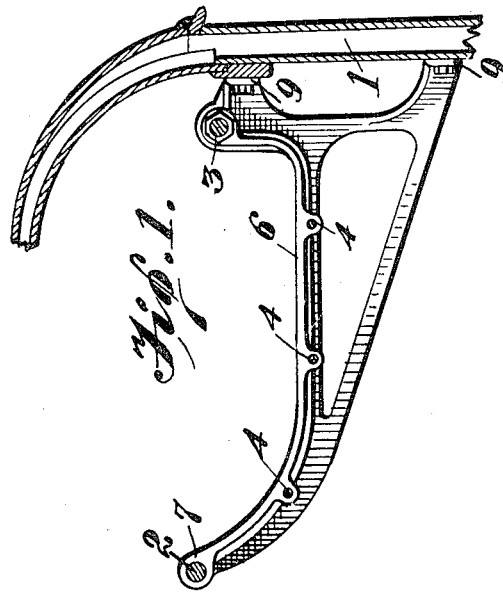
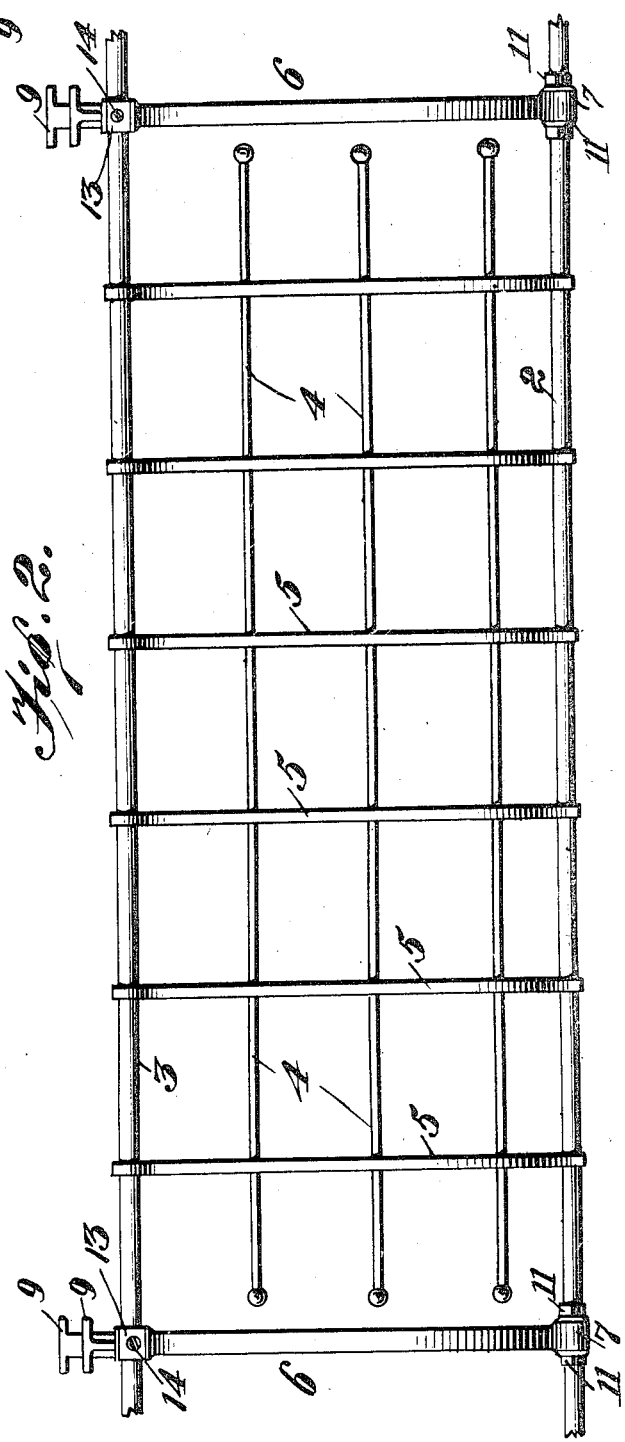
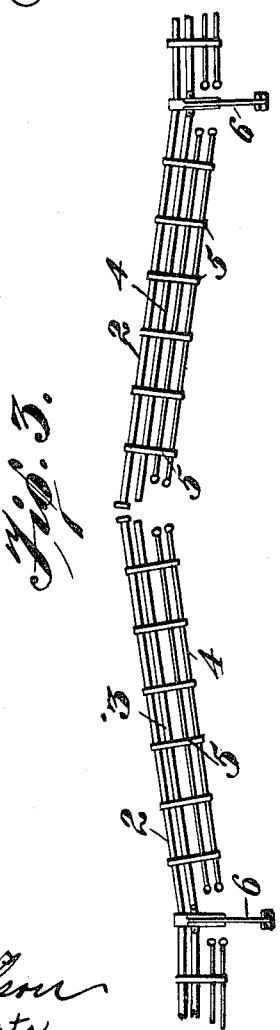
Witnesses
D. Erbilene
A. G. Ports
Inventor
WILLIAM H. MUSSEY.
William T. Jones
Attorney

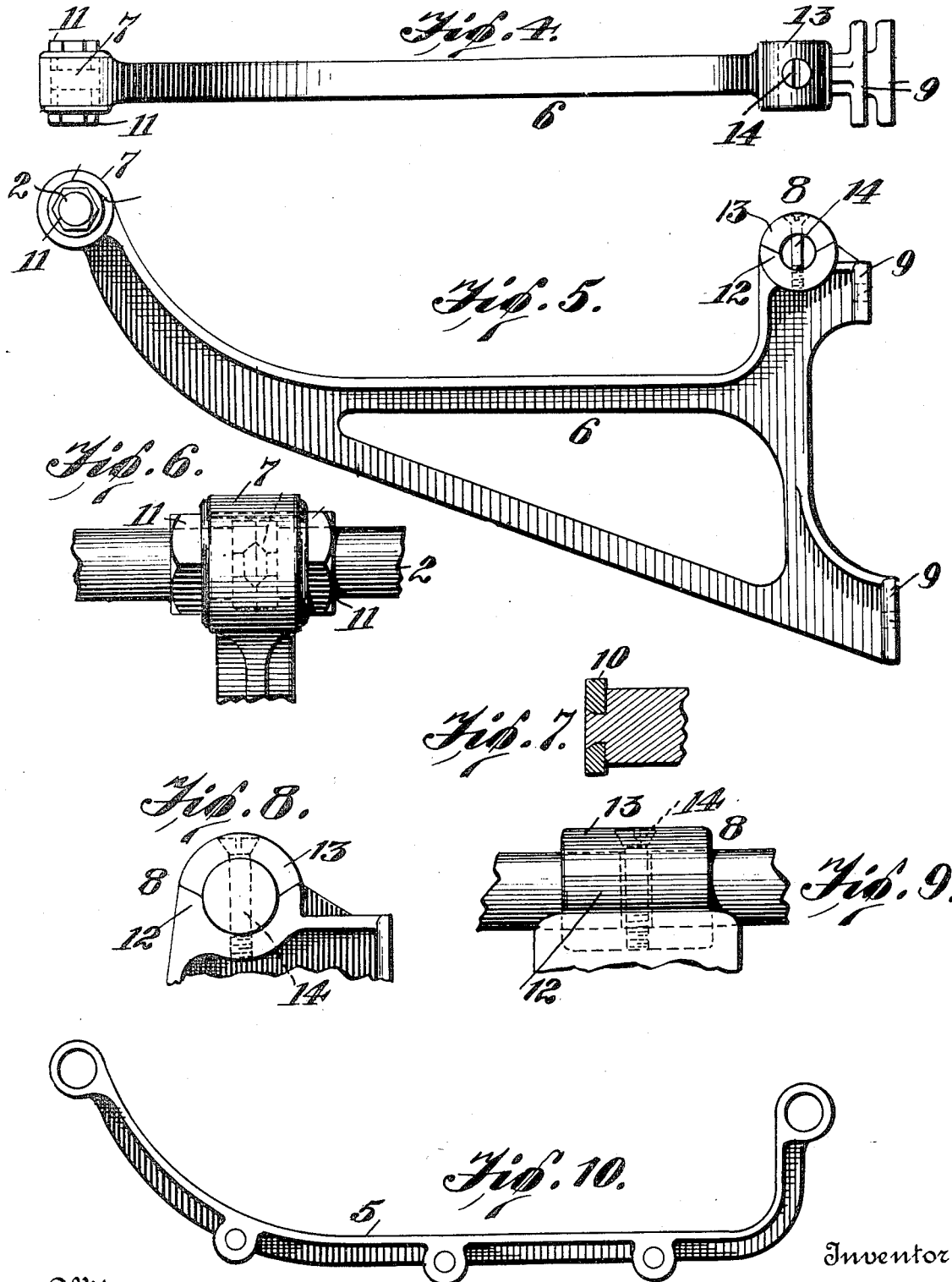

UNITED STATES PATENT OFFICE

WILLIAM H. MUSSEY, OF RICHMOND HILL, NEW YORK.

BASKET-RACK.

1,069,569.  Specification of Letters Patent.  Patented Aug. 5, 1913.

Application filed February 21, 1912. Serial No. 679,185.

*To all whom it may concern:*

Be it known that I, WILLIAM H. MUSSEY, a citizen of the United States, residing at Richmond Hill, Long Island, in the county of Queens and State of New York, have invented certain new and useful Improvements in Basket-Racks, of which the following is a specification.

My invention relates to improvements in basket racks for passenger cars, and the objects thereof are to provide a rack which is substantially even and unobstructed throughout its entire longitudinal extent; to provide a rack which may be easily and quickly set up and taken down; and to devise a rack consisting of but few parts which are simple in construction and comparatively inexpensive to manufacture.

To the accomplishment of the recited objects and others coördinate therewith, the preferred embodiment of my invention resides in that construction and arrangement of parts hereinafter described, illustrated in the accompanying drawings, and embraced within the scope of the appended claims.

In said drawings: Figure 1 is a sectional end elevation of the rack and applied to the upper wall of an ordinary passenger car. Fig. 2 is a top plan view of the basket rack. Fig. 3 is a view of the basket rack showing the manner of assembling the component parts thereof. Figs. 4 and 5 are respectively a top plan and a side elevation of one of the brackets. Fig. 6 is a detail side elevation of the outer terminal of one of the brackets. Fig. 7 is a detail view of the end of one of the rear longitudinal rods. Figs. 8 and 9 are detail views of the rear fastening means carried by each bracket, and Fig. 10 is a side elevation of one of the transverse connecting rods.

Referring more particularly to the drawings for a detail description of my invention, the numeral 1 designates the upper wall portion of a passenger car to which the basket rack is adapted to be secured. The basket rack comprises front and rear longitudinal rods 2 and 3, intermediate longitudinal rods 4, and transverse connecting rods 5. The ends of the front and rear longitudinal rods are designed to be securely maintained in their adjusted positions by the brackets 6, each of which consists of a suitable piece of metal of the general configuration of a triangle, the outer end thereof being formed into an eye, as 7 and the rear end having a split sleeve fastening means 8 and suitable lateral projections 9 which serve to receive the screws for fastening the brackets to the wall of a car. The outer eye 7 of each bracket is internally screw threaded, and the terminals of the front longitudinal rods 2 are provided with annular flanges 10, as best exhibited in Fig. 7 of the drawings, and nuts 11 freely movable longitudinally of the rods.

As before stated, a split sleeve fastening is formed on the upper portion of the rear of the bracket. This fastening comprises specifically a pair of substantially semi-circular shaped compression sections 12 and 13, and a screw, as 14, which extends medially through the sections to hold the same together. The adjacent edges of the last mentioned sections are properly inclined to prevent any relative displacement thereof when in active position.

In assembling the basket rack, a given number of brackets 6 are arranged at certain predetermined intervals along the upper wall portion 1 of the car. With the nuts 11 loose on the front longitudinal rods 2 and the upper section 13 of the split sleeve fastening 8 at the rear of the bracket removed, the terminals of the front and rear longitudinal rods are inserted into the eye 7 and section 12, respectively, of the bracket, whereupon nuts 11 are brought into engagement with the internal screw threads of said eye, and the upper section 13 of the fastening 8 is secured by the vertical screw 14. When it is desired to dismantle the basket rack, the machine screws which coöperate with the lateral projections 9 to secure the brackets to the wall, are removed and the compression member 13 disengaged, which will permit the bracket to swing down in a vertical position. Then the nuts 11 are unscrewed and slid back upon the rods 2. The bracket can then be readily moved longitudinally of the front rod 2 adjacent to the basket which it is desired to disconnect. With one bracket out of the way, the compression member 13 and nut 11 at the opposite end of the basket can be disengaged and the basket then removed. It follows that in this way any number of baskets can be taken down by the removal of a single bracket.

What is claimed, is:

1. In a basket rack, the combination of a pair of wall brackets, each bracket having an internally screw-threaded eye and a split sleeve fastening, a unitary shelf-structure comprising front and rear longitudinal rods, the front rods being provided at their terminals with annular flanges, and means freely movable longitudinally of said front rods adapted to engage the walls of said eye and the edges of said flanges, said split sleeve fastening being designed to secure the rear rods.

2. In a basket rack, a bracket provided with bearing sockets comprising a pair of compression sections and an eye for receiving the adjacent terminals of the main rails of the rack, and means for connecting said sections and eye to the rails.

3. In a basket rack, a bracket having a pair of compression sections and an eye for receiving the adjacent terminals of the main rails of the rack, and means movable in planes at right angles to each other for connecting said sections and eye to the rails.

4. In a basket rack, a bracket having a socket at one end and an eye at the other end for receiving the adjacent terminals of the main rails of the rack, the latter being insertible solely in the direction of length of the rails, and means for connecting said socket and eye to the longitudinal rods of the rack.

5. In a basket rack, a bracket provided with a pair of compression sections and an eye for receiving the main rails of the rack, and means for connecting said sections and eye to the rails, the adjacent ends of said sections being inclined.

6. In a baggage rack of the character described, the combination of a plurality of brackets, a shelf arranged to be supported between said brackets and having a main supporting bar insertible within a bracket solely in the direction of length of the bar, and a coupling member carried by each end of said bar adjustable longitudinally thereof and engaging within and longitudinally adjustable relative to a bracket.

7. In a baggage rack of the character described, the combination of a plurality of brackets, a shelf arranged to be supported between said bracket and having a main supporting bar insertible within a bracket solely in the direction of length of the bar, and a coupling sleeve carried by each end of said bar adjustable longitudinally thereof and engaging within and longitudinally adjustable relative to a bracket.

8. In a baggage rack of the character described, the combination of a plurality of longitudinally alined brackets, a plurality of shelf units arranged to be independently supported between adjacent brackets, each shelf unit having a main supporting bar insertible within a bracket solely in the direction of length of the bar, and an independent coupling member carried by each end of each supporting bar and engaging within the adjacent bracket, each coupling member being adjustable longitudinally of its bar and of its coöperating bracket.

In testimony whereof I hereunto affix my signature in presence of two witnesses.

WILLIAM H. MUSSEY.

Witnesses:
WM. MORRISON,
R. H. ALLEN.